(12) United States Patent
Watanabe

(10) Patent No.: US 6,212,245 B1
(45) Date of Patent: *Apr. 3, 2001

(54) COMMUNICATION APPARATUS

(75) Inventor: Mitsuhiro Watanabe, Ebina (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,204

(22) Filed: Jul. 1, 1996

(30) Foreign Application Priority Data

| Jul. 13, 1995 | (JP) | ........................ 7-177375 |
| Sep. 19, 1995 | (JP) | ........................ 7-239852 |
| Sep. 29, 1995 | (JP) | ........................ 7-275087 |

(51) Int. Cl.⁷ ..................................... H03D 1/04
(52) U.S. Cl. ..................... 375/346; 455/218; 455/229; 375/217
(58) Field of Search ........................ 375/346, 347, 375/350, 316, 217; 455/222, 218, 226.2, 229

(56) References Cited

U.S. PATENT DOCUMENTS

| 3,939,425 | * | 2/1976 | Toyoshima | .......................... 325/348 |
| 4,020,421 | * | 4/1977 | Elder et al. | .......................... 325/478 |
| 4,661,996 | * | 4/1987 | Scandurra | .......................... 455/205 |
| 4,752,941 | * | 6/1988 | Takahara et al. | .......................... 375/100 |
| 4,833,725 | * | 5/1989 | Teetor | ............................. 455/67 |
| 4,945,312 | * | 7/1990 | Auger et al. | ......................... 329/345 |
| 4,958,359 |   | 9/1990 | Kato . | |
| 4,972,510 | * | 11/1990 | Guizerix et al. | .................... 455/212 |
| 5,193,216 | * | 3/1993 | Davis | ............................. 455/67.7 |
| 5,280,525 | * | 1/1994 | Wesel | ............................. 379/400 |
| 5,406,588 | * | 4/1995 | Birchler et al. | .................... 375/346 |
| 5,426,666 |   | 6/1995 | Kato . | |
| 5,430,770 | * | 7/1995 | Abbey | ............................ 375/349 |
| 5,430,894 | * | 7/1995 | Nohara et al. | ...................... 455/296 |
| 5,465,405 | * | 11/1995 | Baseghi et al. | .................. 455/226.4 |
| 5,493,716 | * | 2/1996 | Bane | .............................. 455/296 |
| 5,557,646 | * | 9/1996 | Honma | ........................... 375/346 |
| 5,612,975 | * | 3/1997 | Becker et al. | ...................... 375/319 |
| 5,687,229 | * | 11/1997 | Sih | ................................ 379/410 |
| 5,692,017 | * | 11/1997 | Shiokawa | .......................... 375/346 |

FOREIGN PATENT DOCUMENTS

| 0 488 173 | 6/1992 | (EP) . |
| 4-168812 | 6/1992 | (JP) . |
| 6-140949 | 5/1994 | (JP) . |

* cited by examiner

*Primary Examiner*—Stephen Chin
*Assistant Examiner*—Mohammad Ghayour
(74) *Attorney, Agent, or Firm*—Morgan & Finnegan, LLP

(57) ABSTRACT

The high-frequency component removing circuit is immediately started, and is not stopped unless the measurement value of the received electric intensity has maintained a value equal to or higher than the filter level for 1 sec after the high-frequency component removing circuit is started. Therefore, when the received electric intensity fluctuates around the filter level during a speech communication, the switching operation of repetitively starting and stopping the high-frequency component removing circuit is suppressed. As a result, the number of times of switching operations that repetitively start and stop the high-frequency component removing circuit is reduced, and the signal tone upon switching can be suppressed from mixing into the audio signal as noise in a speech communication. In addition, even when the received electric intensity fluctuates around the filter level, a speech communication environment that does not allow noise to easily mix can be obtained.

20 Claims, 14 Drawing Sheets

FIG. 7

ADDRESS

| Address | Value | Description |
|---|---|---|
| 00 | I D | |
| 01 | I D | |
| 02 | I D | |
| 03 | I D | |
| 04 | 7 0 | CARRIER SENSE LEVEL |
| 05 | 6 0 | MUTE LEVEL |
| 06 | A 0 | FILTER LEVEL |
| ⋮ | ⋮ | |
| FF | F F | |

STORAGE AREA OF EEPROM

FIG. 12

| ADDRESS | | | |
|---|---|---|---|
| 00 | I | D | |
| 01 | I | D | |
| 02 | I | D | |
| 03 | I | D | |
| 04 | 8 | 0 | CARRIER LEVEL REFERENCE VALUE |
| 05 | F | 0 | CARRIER SENSE OFFSET |
| 06 | E | 0 | MUTE LEVEL OFFSET |
| 07 | 2 | 0 | FILTER LEVEL OFFSET |
| ⋮ | ⋮ | ⋮ | |
| FF | F | F | |

STORAGE AREA OF EEPROM

COMMUNICATION APPARATUS

BACKGROUND OF THE INVENTION

The present invention relates to a communication apparatus which controls communications in accordance with the reception state.

A communication apparatus such as a cordless telephone apparatus comprises a filter for removing noise.

However, if the received signal is filtered even when the reception state is good, i.e., is free from noise, the sound quality is impaired.

Conventionally, discrimination of the presence/absence of a carrier is attained by circuit design. More specifically, a circuit for outputting a HIGH- or LOW-level voltage indicating whether or not the electric intensity is higher than a prescribed value is designed, and the output from this circuit is monitored by a CPU, thereby discriminating the presence/absence of the carrier.

However, in this prior art, the prescribed value varies due to performance variations of parts. For example, even when the presence/absence of the carrier is to be discriminated using a prescribed value of 1.3 $\mu$V, the prescribed value varies in practice, and it is difficult to comply with the pertinent regulation.

When a plurality of carrier level prescribed values are used for controlling the circuit, carrier level discrimination circuits corresponding in number to the prescribed values must be prepared, resulting in high cost.

SUMMARY OF THE INVENTION

It is an object of the present invention to improve the quality of a communication signal.

It is another object of the present invention to improve noise removal.

It is still another object of the present invention to reduce the margin for absorbing variations in performance of parts.

It is still another object of the present invention to accurately discriminate the presence/absence of a carrier.

It is still another object of the present invention to provide an arrangement for improving the quality of a communication signal.

Other objects of the present invention will become apparent from the following description of the embodiments taken in conjunction with the accompanying drawings.

BRIEF DESCRIPTION OF THE DRAWINGS

FIG. 7 is a view showing the address map of an EEPROM;

FIG. 12 is a view showing a modification of the address map of the EEPROM;

DETAILED DESCRIPTION OF THE PREFERRED EMBODIMENTS

Figure 1:
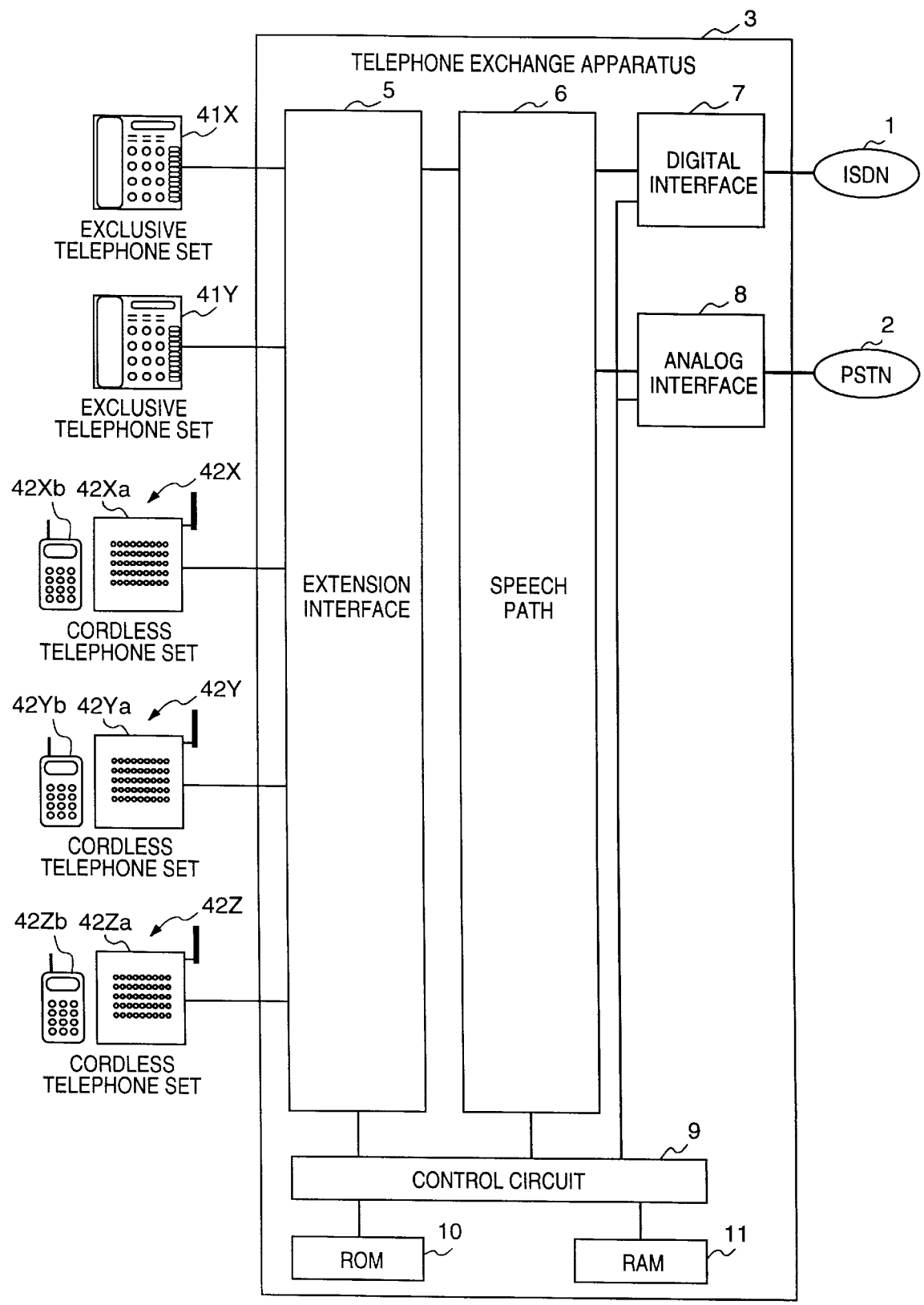
FIG. 1 is a block diagram showing the arrangement of a telephone exchange apparatus whose extensions accommodate cordless telephone sets according to the present invention.

FIG. 1 is a block diagram showing the arrangement of a telephone exchange apparatus whose extensions accommodate cordless telephone sets.

As shown in FIG. 1, a telephone exchange apparatus 3 comprises a digital interface 7 for connecting a digital communication network (ISDN) 1, an analog interface 8 for connecting an analog communication network (PSTN) 2, and an extension interface 5. A plurality of extension telephone sets 41X and 41Y, and a plurality of extension cordless telephone sets 42X, 42Y, and 42Z are connected to the extension interface 5. The extension cordless telephone sets 42X, 42Y, and 42Z comprise radio communication apparatuses constituted by master units 42Xa, 42Ya, and 42Za, and subsidiary units 42Xb, 42Yb, and 42Zb for communicating with the master units 42Xa, 42Ya, and 42Za via radio channels.

Audio information signals from the respective interfaces, i.e., the digital interface 7, the analog interface 8, and the extension interface 5 are exchanged in a speech path 6, and the respective interfaces, i.e., the digital interface 7, the analog interface 8, the extension interface 5, and the speech path 6 are controlled by a control circuit. A program indicating the control sequence to be executed by the control circuit 9 is stored in a ROM 10, and a RAM 11 is used as a work area for arithmetic operation processing required for the control of the control circuit 9.

Figure 2:
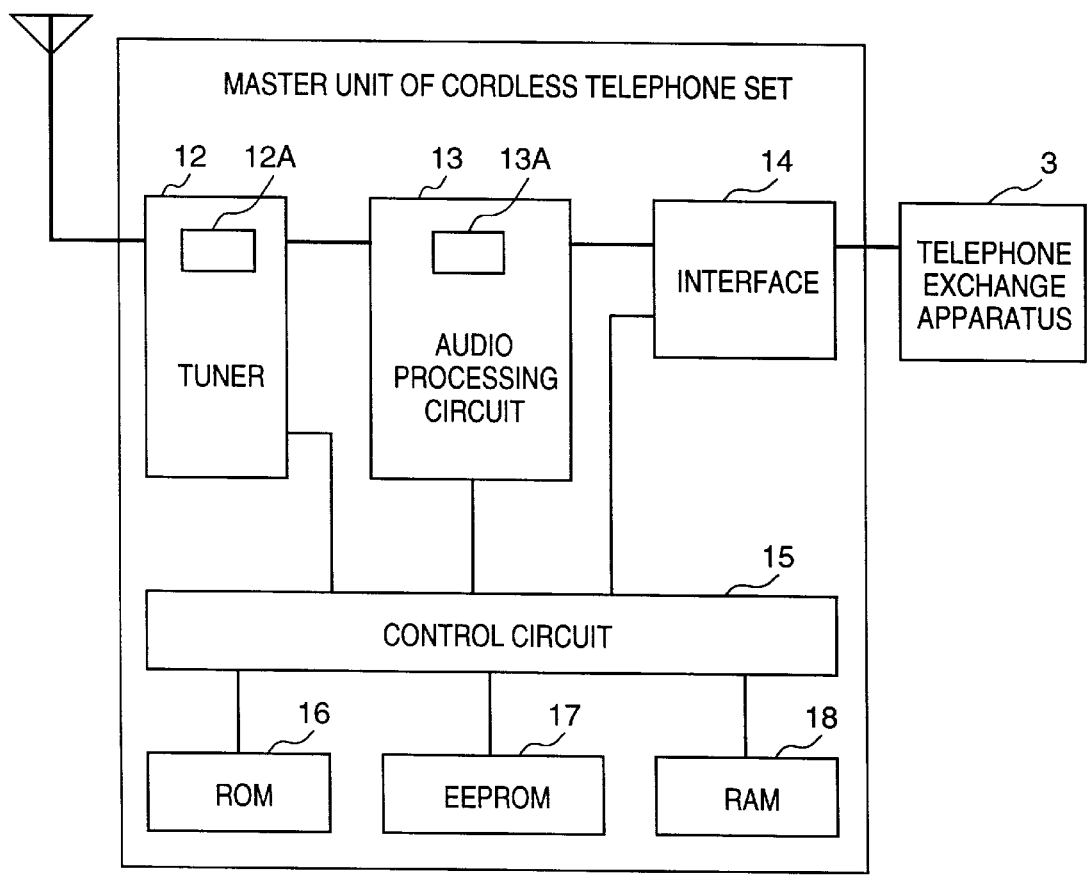
FIG. 2 is a block diagram showing the arrangement of a master unit of an extension cordless telephone set.
Figure 3:
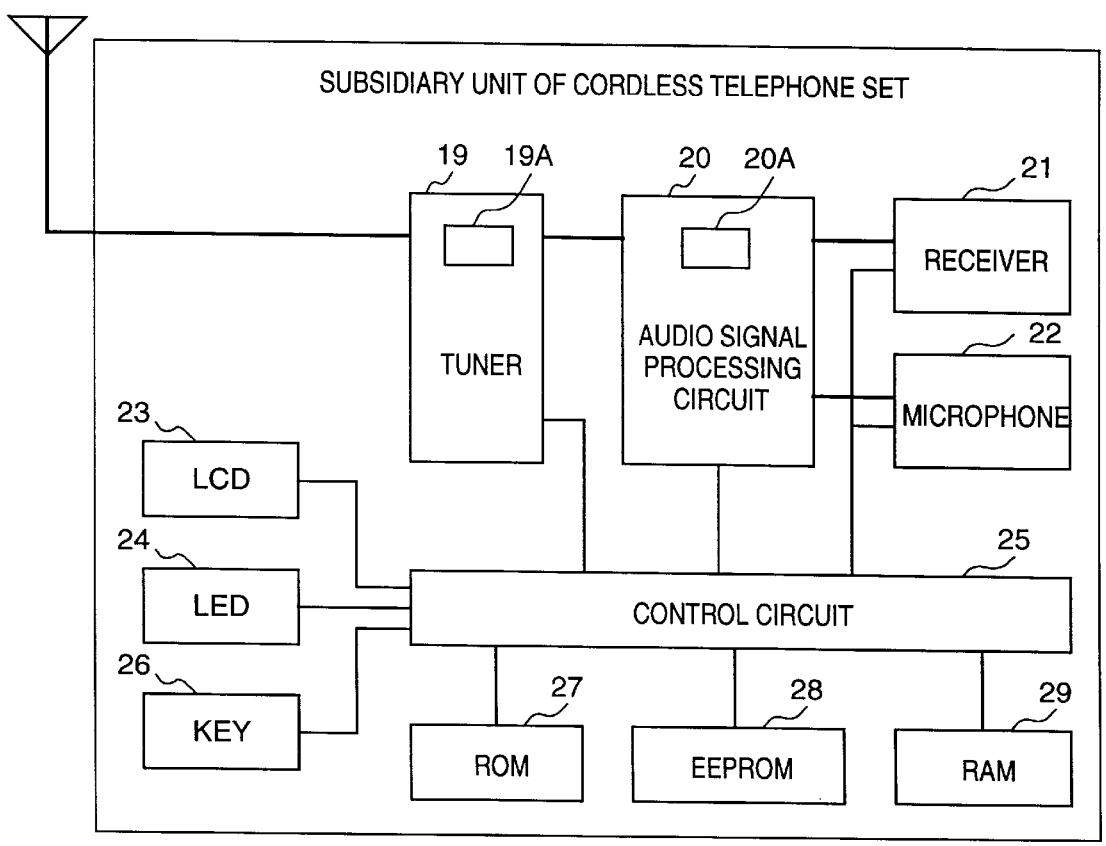
FIG. 3 is a block diagram showing the arrangement of a subsidiary unit of the extension cordless telephone set.

The arrangement of the extension cordless telephone set 42 will be described below with reference to FIGS. 2 and 3. FIG. 2 is a block diagram showing the arrangement of the master unit of the extension cordless telephone set shown in FIG. 1, and FIG. 3 is a block diagram showing the subsidiary unit of the extension cordless telephone set shown in FIG. 1.

As shown in FIG. 2, each of the master units 42Xa, 42Ya, and 42Za has an interface 14 connected to the telephone exchange apparatus 3, and audio information is exchanged between the telephone exchange apparatus 3 and a tuner 12 via the interface 14 and an audio processing circuit 13.

The tuner 12 performs transmission processing for modulating audio information by radio waves of a predetermined frequency, and transmitting the modulated signal from an antenna, and reception processing for demodulating radio waves transmitted from the subsidiary unit and received by the antenna, and outputting the demodulated signal to the audio processing circuit 13. The tuner 12 includes a measurement circuit 12A for measuring the received electric intensity indicating the strength of radio waves received by the antenna. The audio processing circuit 13 performs predetermined processing for audio information. The audio processing circuit 13 includes a high-frequency component removing circuit 13A for removing high-frequency components included in an audio signal received from the subsidiary unit. The high-frequency component removing circuit 13A comprises a filter circuit for attenuating frequency components equal to or higher than a predetermined frequency.

The interface 14, the audio processing circuit 13, and the tuner 12 are controlled by a control circuit 15. A control program to be executed by the control circuit 15 is stored in a ROM 16, and control information used in the control is stored in an EEPROM 17 together with ID information of the extension cordless telephone set, and the like. In addition, a RAM 18 is used as a work area of arithmetic operation processing required for the control of the control circuit 15.

The control program stored in the ROM 16 includes a program for controlling the start and stop operations of the high-frequency component removing circuit 13A in correspondence with the measured received electric intensity. This program includes control for discriminating whether or not the measured received electric intensity is lower than a reference level, and control for discriminating if the measured electric intensity has maintained a value equal to or higher than the reference level for a predetermined period of time (e.g., 1 sec). If the measured received electric intensity is lower than the reference level, the program outputs a control signal for starting the high-frequency component removing circuit 13A. On the other hand, when the measured received electric intensity has maintained a value equal to or higher than the reference level for the predetermined period of time, the program outputs a control signal for stopping the high-frequency component removing circuit 13A.

The arrangement of the subsidiary unit will be described below with reference to FIG. 3.

As shown in FIG. 3, each of the subsidiary units 42Xb, 42Yb, and 42Zb has a tuner 19 for performing radio communications with the master unit. The tuner 19 performs transmission processing for modulating an audio signal from an audio processing circuit 20 with radio waves of a predetermined frequency, and transmitting the modulated audio signal to the master unit via the antenna, and reception processing for demodulating radio waves received from the master unit via the antenna, and outputting the demodulated signal to the audio processing circuit 20. The tuner 19 includes a measurement circuit 19A for measuring the received electric intensity indicating the strength of radio waves received by the antenna.

A receiver 21 and a microphone 22 are connected to the audio processing circuit 20. An audio signal supplied from the master unit is output from the receiver 21, and an audio signal on the subsidiary unit is input to the microphone 22. The audio processing circuit 20 includes a high-frequency component removing circuit 20A for removing high-frequency components included in an audio signal received from the master unit. The high-frequency component removing circuit 20A comprises a filter circuit for attenuating frequency components equal to or higher than a redetermined frequency.

The microphone 22, the receiver 21, the audio signal processing circuit 20, and the tuner 19 are controlled by a control circuit 25. The control circuit 25 also performs the detection control of an input from keys 26, the display control of an LCD 23, the indication control of an LED 24 as well as the control of the tuner 19 and the like. A control program to be executed by the control circuit 25 is stored in a ROM 27. Control information used in the control is stored in an EEPROM 28 together with ID information of the extension cordless telephone set. In addition, a RAM 29 is used as a work area of arithmetic operation processing required for the control of the control circuit 15.

The control program stored in the ROM 27 includes a program for controlling the start and stop operations of the high-frequency component removing circuit 20A in correspondence with the measured received electric intensity as in the master unit.

Figure 4:
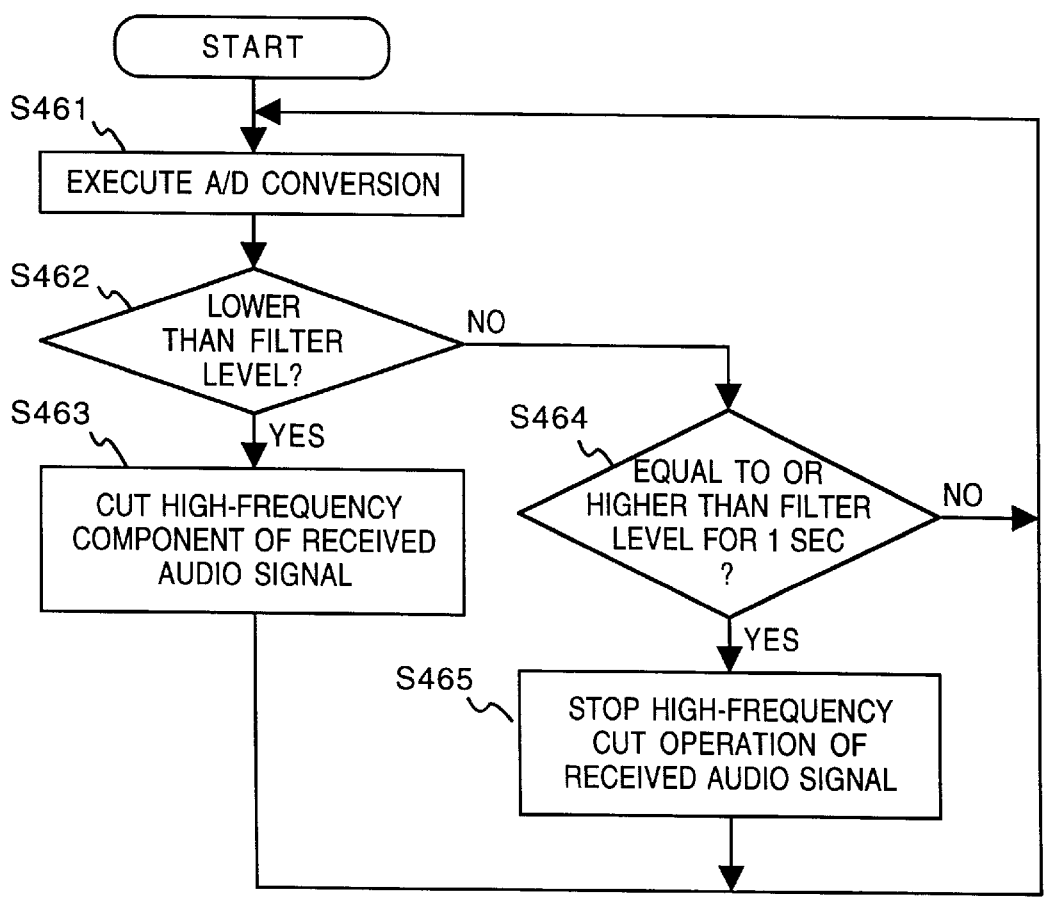
FIG. 4 is a flow chart showing the first example of control for a high-frequency component removing circuit in the master unit of the extension cordless telephone set.

The control operations for the high-frequency component removing circuits 13A and 20A in the extension cordless telephone set 42 will be described below with reference to FIG. 4. FIG. 4 is a flow chart showing the control operation for the high-frequency component removing circuit 13A in the master unit of the extension cordless telephone set shown in FIG. 2. Note that the start and stop operations of the high-frequency component removing circuit 13A under the control of the control circuit 15 of the master unit are the same as those of the high-frequency component removing circuit 20A under the control of the control circuit 25 of the subsidiary unit. Therefore, the control operation of the control circuit 15 of the master unit will be described below, and a description of the control operation of the control circuit 25 of the subsidiary unit will be omitted.

The control circuit 15 of the master unit, which is engaged in speech communication with the subsidiary unit, A/D-converts the measurement value of the received electric intensity measured by the tuner 12 into digital data (step S461 in FIG. 4).

It is checked if the measurement value of the received electric intensity is lower than a filter level pre-stored in the EEPROM 17, and it is checked if the measurement value of the received electric intensity has maintained a value equal to or higher than the filter level for 1 sec (steps S462 and S464). The filter level serves as a reference value used for discriminating whether or not the received electric intensity is strong enough to prevent noise from mixing. If the received electric intensity has a value equal to or higher than the filter level, it is determined that the received electric intensity is strong enough to prevent noise from mixing. On the other hand, if the received electric intensity has a value lower than the filter level, it is determined that the received electric intensity is weak and susceptible to mixing of noise.

If the measurement value of the received electric intensity has a value lower than the filter level (step S462), a control signal for starting the high-frequency component removing circuit 13A is output (step S463), and the high-frequency component removing circuit 13A is started in response to this control signal.

In contrast to this, if the measurement value of the received electric intensity has maintained a value equal to or higher than the filter level for 1 sec (step S464), a control signal for stopping the high-frequency component removing circuit 13A is output (step S465), and the high-frequency component removing circuit 13A is stopped in response to this control signal.

After the control signal for starting or stopping the high-frequency component removing circuit 13A is output, the flow returns to step S461.

As described above, when the measurement value of the received electric intensity is smaller than the filter level (reference level), the high-frequency component removing circuit is started; when the measurement value of the received electric intensity has maintained a value equal to or higher than the filter level for 1 sec, the high-frequency component removing circuit is stopped. For this reason, the high-frequency component removing circuit is immediately started, and is not stopped unless the measurement value of the received electric intensity has maintained a value equal to or higher than the filter level for 1 sec after the high-frequency component removing circuit is started. Therefore, when the received electric intensity fluctuates around the filter level during a speech communication, the switching operation of repetitively starting and stopping the high-frequency component removing circuit is suppressed. As a result, the number of times of switching operations that repetitively start and stop the high-frequency component removing circuit is reduced, and the signal tone upon switching can be suppressed from mixing into the audio signal as noise in a speech communication. In addition, even when the received electric intensity fluctuates around the filter level, a speech communication environment that does not allow noise to easily mix can be obtained.

The second example of the control operation for the high-frequency component removing circuit in the extension cordless telephone set will be described below with reference to the flow chart shown in FIG. 5.

In this example, each of the high-frequency component removing circuits 13A and 20A comprises a filter circuit which can switch the effect of its attenuation processing for high-frequency components included in the received audio signal by two levels, i.e., strong and weak levels.

In this example, the control for starting and stopping the high-frequency component removing circuit includes discrimination as to whether or not the measurement value of the received electric intensity is lower than reference level 2, discrimination as to whether or not the measurement value of the received electric intensity is lower than reference level 1 higher than reference level 2 when it has maintained a value equal to or higher than reference level 2 for a predetermined period of time (e.g., 1 sec), and discrimination as to whether or not the measurement value of the received electric intensity has maintained a value equal to or higher than reference level 1 for a predetermined period of time (e.g., 1 sec), and the start and stop operations of the high-frequency component removing circuit are controlled in accordance with these discrimination results.

Reference levels 1 and 2 serve as reference values used for discriminating whether or not the received electric intensity is strong enough to prevent noise from mixing. If the received electric intensity has a value equal to or higher than reference level 1, it is determined that the received electric intensity is strong enough to prevent noise from mixing. In contrast to this, if the received electric intensity has a value between reference levels 1 and 2, it is determined that the received electric intensity is weak to the extent the probability of noise mixing is slightly high. Furthermore, if the received electric intensity has a value lower than reference level 2, it is determined that the received electric intensity is weak to the extent the probability of noise mixing is high.

The control operations of the high-frequency component removing circuits 13A and 20A will be described below with reference to FIG. 5. Note that the start and stop operations of the high-frequency component removing circuit 13A under the control of the control circuit 15 of the master unit are the same as those of the high-frequency component removing circuit 20A under the control of the control circuit 25 of the subsidiary unit. Therefore, the control operation of the control circuit 15 of the master unit will be described below, and a description of the control operation of the control circuit 25 of the subsidiary unit will be omitted.

Figure 5:
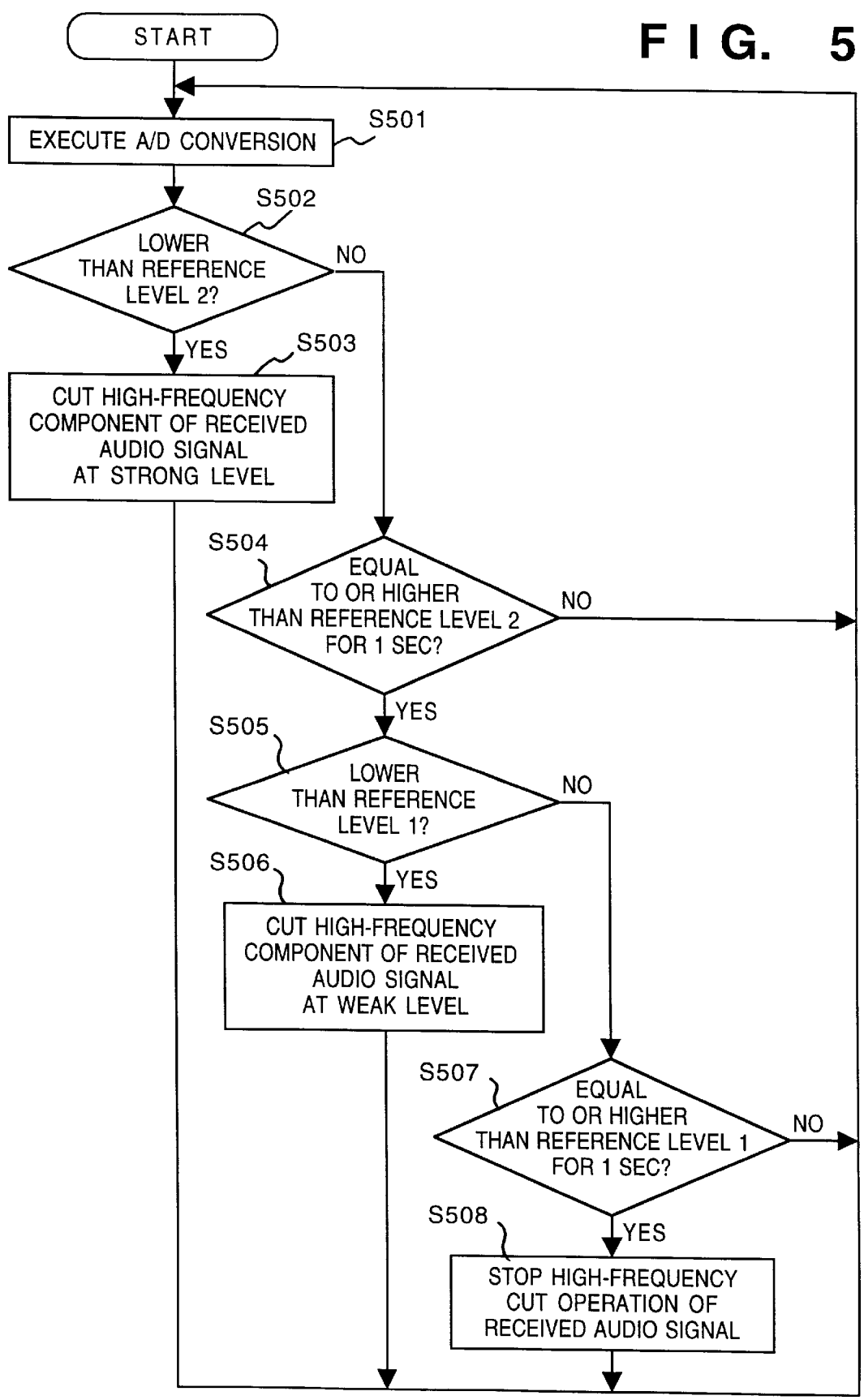
FIG. 5 is a flow chart showing the second example of control for a high-frequency component removing circuit in the master unit of the extension cordless telephone set.

As shown in FIG. 5, the control circuit 15 of the master unit, which is engaged in speech communication with the subsidiary unit, A/D-converts the measurement value of the received electric intensity measured by the tuner 12 into digital data (step S501).

It is checked if the measurement value of the received electric intensity is lower than reference level 2 (step S502), it is checked if the measurement value of the received electric intensity lowers to a value lower than reference level 1 higher than reference level 2 when it has maintained a value equal to or higher than reference level 2 for 1 sec (steps S504 and S505), and it is checked if the measurement value of the received electric intensity has maintained a value equal to or higher than reference level 1 for 1 sec (step S507).

If the measurement value of the received electric intensity is lower than reference level 2 pre-stored in the EEPROM 17 (step S502), a control signal for starting the high-frequency component removing circuit 13A and setting strong attenuation processing is output (step S503). With this control signal, the high-frequency component removing circuit 13A is started, and the effect of its attenuation processing is set at strong level.

If the measurement value of the received electric intensity lowers to a value lower than reference level 1 which is pre-stored in the EEPROM 17 and is higher than reference level 2 when it has maintained a value equal to or higher than reference level 2 for 1 sec (steps S504 and S505), a control signal for starting the high-frequency component removing circuit 13A and setting weak attenuation processing is output (step S506). With this control signal, the high-frequency component removing circuit 13A is started, and the effect of its attenuation processing is set at weak level.

If the measurement value of the received electric intensity has maintained a value equal to or higher than reference level 1 for 1 sec (step S507), a control signal for stopping the high-frequency component removing circuit 13A is output (step S508). With this control signal, the high-frequency component removing circuit 13A is stopped.

After the control signal for starting or stopping the high-frequency component removing circuit 13A is output, the flow returns to step S501.

After the effect of the attenuation processing of the high-frequency component removing circuit 13A is set at strong level, it is not switched to weak level until the measurement value of the received electric intensity has maintained a value equal to or higher than reference level 2 for 1 sec and then lowers to a value lower than reference level 1 higher than reference level 2. For this reason, the switching operation of the effect of the attenuation processing between strong and weak levels is not frequently performed. Therefore, the signal tone upon switching can be suppressed from mixing into an audio signal as noise in a speech communication.

The control operation of the control circuit 15 of the master unit, which performs a muting operation as well as the high-frequency component removing operation, will be described below. Note that each of the audio processing circuits 13 and 20 comprises a mute circuit in addition to the filter circuit for removing high-frequency components.

Figure 6:
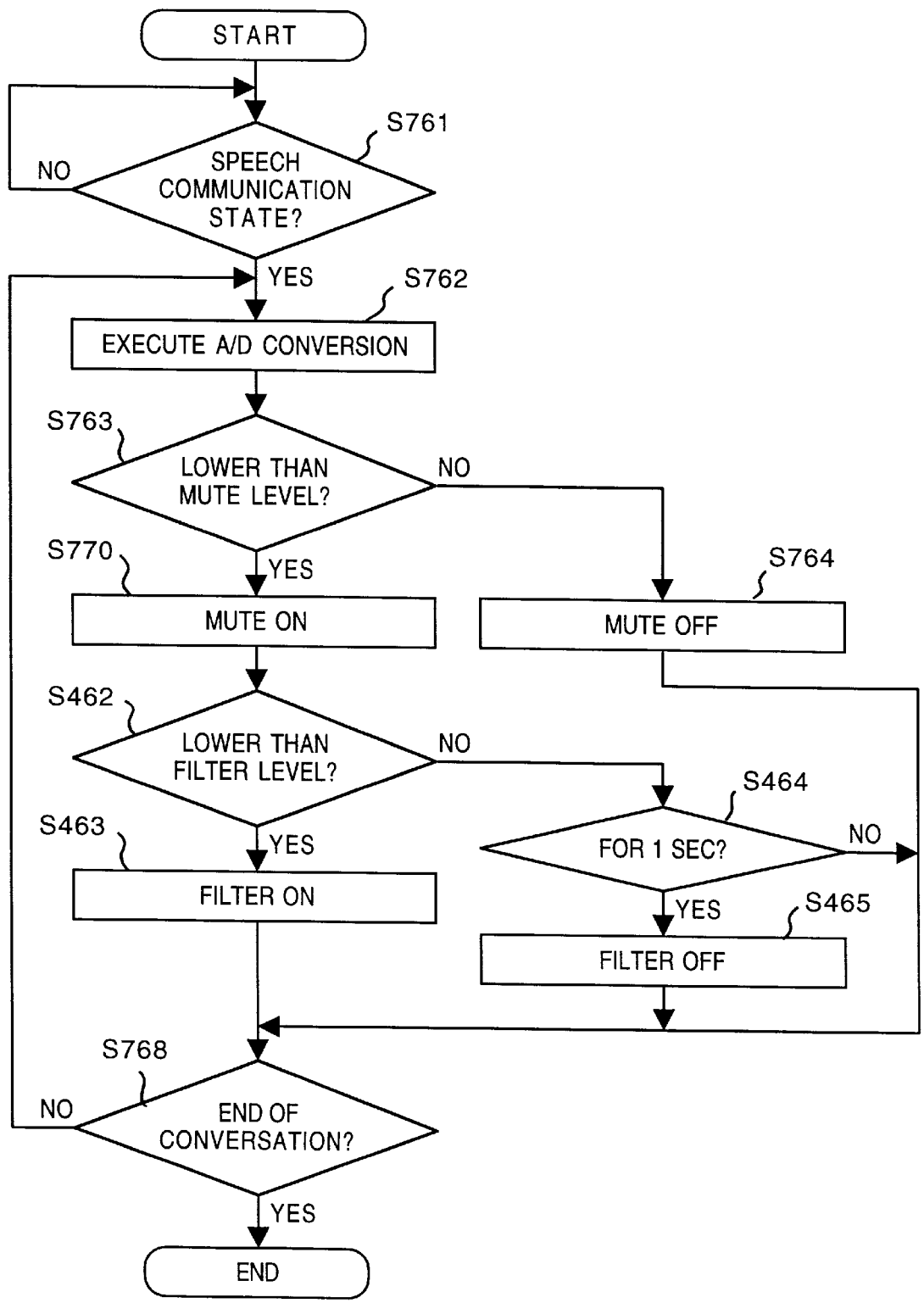
FIG. 6 is a flow chart showing mute and filter control.

FIG. 6 is a flow chart showing the control method when both the mute and filter operations are performed. When a connection is established (S761), the control circuit 15 of the master unit of the cordless telephone set monitors the electric intensity. If the value obtained by A/D conversion (S762) is lower than a mute level (S763), the control circuit 15 controls the audio processing circuit 13 to turn on the mute circuit (S770) so that the user cannot hear a sound received via the antenna; otherwise, the control circuit 15 turns off the mute circuit (S764). If the A/D-converted value is lower than a filter level higher than the mute level (S462), the control circuit 15 controls the audio processing circuit 13 to turn on the filter circuit (S463), so that the user hardly hears noise received via the antenna. If the A/D-converted value has maintained a value equal to or higher than the filter level for 1 sec, the control circuit turns off the filter circuit (S464, S465). The control operations of the mute and filter circuits are continued until the conversation ends (S768).

These control operations are similarly executed in the subsidiary unit of the cordless telephone set.

The mute and filter levels are stored in the EEPROMs 17 and 28, as shown in FIG. 7. These levels may be registered in the EEPROMs 17 and 18 by inputting the mute and filter level values using keys. Alternatively, the mute and filter levels may be stored on the basis of the measurement value of the received electric intensity, as will be described below.

Note that the EEPROMs 17 and 28 also store a carrier sense level in addition to the mute and filter levels.

Level registration will be explained below with reference to FIG. 8. For the sake of simplicity, a method of registering a carrier level in the EEPROM 17 of the master unit of the cordless telephone set will be explained below. The carrier level is registered in the EEPROM 17 of the master unit of the cordless telephone set by applying a radio wave output of a specific channel (e.g., 46th channel) to the antenna terminal of the tuner 12 at a specific strength (e.g., 1.7 $\mu$V). In this state, after a test mode key (not shown) is depressed by operating the extension telephone set 41X, a terminal number for designating the master unit and a specific number indicating carrier level registration are input by depressing keys. Thus, the telephone exchange apparatus 3 transmits a carrier level registration command to the master unit of the designated terminal number.

Upon reception of the carrier level registration command (S461), the control circuit 15 of the master unit of the cordless telephone set sets the tuner 12 to have a specific reception channel (e.g., 46th channel) (S462), sets a timer (S463), and starts A/D conversion (S464). This A/D conversion is repetitively executed until the timer reaches a time-out state, and after the timer has reached a time-out state (S465), the minimum A/D-converted value is registered in the EEPROM 17 as the carrier level (S466).

The method of registering the carrier level in the EEPROM 28 of the subsidiary unit of the cordless telephone set is attained in the same manner as described above. That is, a radio wave output of a specific channel (e.g., 46th channel) is applied to the antenna terminal of the tuner 19 at a specific strength e.g., 1.7 $\mu$V), and a test mode key (not shown) is depressed by operating the keys 26. Thereafter, when a specific number indicating carrier level registration is input by depressing keys (S461), the control circuit 25 sets the tuner 19 to have a specific reception 10 channel (e.g., 46th channel) (S462), sets a timer (S463), and starts A/D conversion (S464). This A/D conversion is repetitively executed until the timer reaches a time-out state, and after the timer has reached a time-out state (S465), the minimum A/D-converted value is registered in the EEPROM 28 as the carrier level (S466).

Referring to FIG. 7, ID data are written from addresses 00 to 03, and the carrier sense level value obtained in step S464 upon application of the radio wave output of 1.7 $\mu$V to the antenna terminal of the tuner 12 by inputting the specific number indicating carrier level registration using keys is written at address 04. The mute or filter level is similarly registered in the EEPROM 17. For example, a radio wave output of 1.3 $\mu$V or 2.5 $\mu$V is applied to the antenna terminal of the tuner 12, and by depressing a specific key indicating mute or filter level registration on the extension telephone set 41X, a value (minimum value) obtained as a result of A/D conversion is registered at address 05 or 06 of the EEPROM 17.

The method of registering the carrier level in the EEPROM 28 of the subsidiary unit of the cordless telephone set is attained in the same manner as described above. That is, when a radio wave output of a specific channel (e.g., 46th channel) is applied to the antenna terminal of the tuner 19 at a specific strength (e.g., 1.7 $\mu$V, 1.3 $\mu$V, or 2.5 $\mu$V), and the keys 26 are operated (for example, after a test mode key (not shown) is depressed, a specific number indicating carrier, mute, or filter level registration is input by depressing keys), the tuner 19 is set to have a specific reception channel (e.g., 46th channel), and a value (minimum value) obtained as a result of A/D conversion is registered as carrier sense level, mute level, or filter level at address 04, 05, or 06 of the EEPROM 28 (S466).

A method of detecting the presence/absence of a carrier of the master unit of the cordless telephone set will be described below with reference to FIG. 9. When the control circuit 15 of the master unit of the cordless telephone set must discriminate the presence/absence of a carrier of a specific channel (e.g., 46th channel), it sets the channel of the tuner 12 (S501), starts the timer (S502), and starts A/D conversion (S503). This A/D conversion is continued until the timer reaches a time-out state (S505) or the A/D-converted value becomes lower than the carrier sense level stored in the EEPROM 17 (S506). In the respective cases, the control circuit 15 determines the presence of a carrier (S506) and the absence of a carrier (S507). When the absence of a carrier is determined before a communication is started, the communication is performed using the channel. When the absence of a carrier of the channel in use for reception is detected, since the partner station has ended the communication, the control circuit 15 also ends the communication.

The same applies to the subsidiary unit of the cordless telephone set. In the case of the subsidiary unit, the control circuit 25, the tuner 19, and the EEPROM 28 respectively replace the control circuit 15, the tuner 12, and the EEPROM 17.

As for a channel other than the 46th channel, a value stored in the EEPROM 17 (i.e., a value obtained by applying a signal of 1.7 $\mu$V to the 46th channel) may be used. As a channel (the 46th channel in the above-mentioned case) used when the value is stored in the EEPROM 17, if the frequency characteristics of the received electric intensity detection of the tuners 12 and 19 are upward to the right, a channel with a higher frequency can be selected to comply with the regulation.

On the other hand, the value obtained by applying a signal of 1.7 $\mu$V to each channel may be stored, and carrier detection may be performed using the stored value.

Modifications of the flow charts shown in FIGS. 8 and 9 will be described below with reference to FIGS. 10 and 11.

Figure 8:
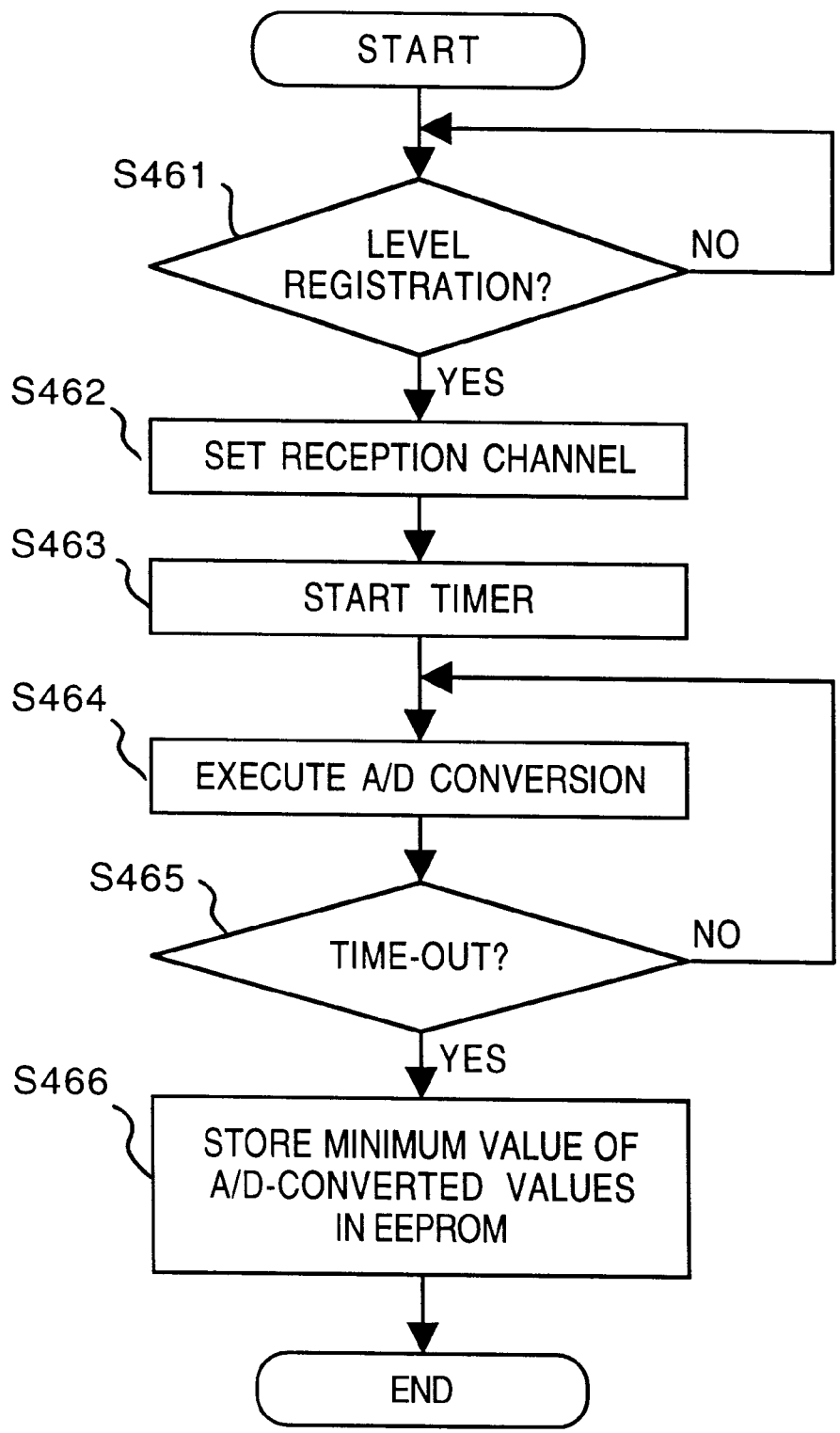
FIG. 8 is a flow chart of carrier level registration.
Figure 10:
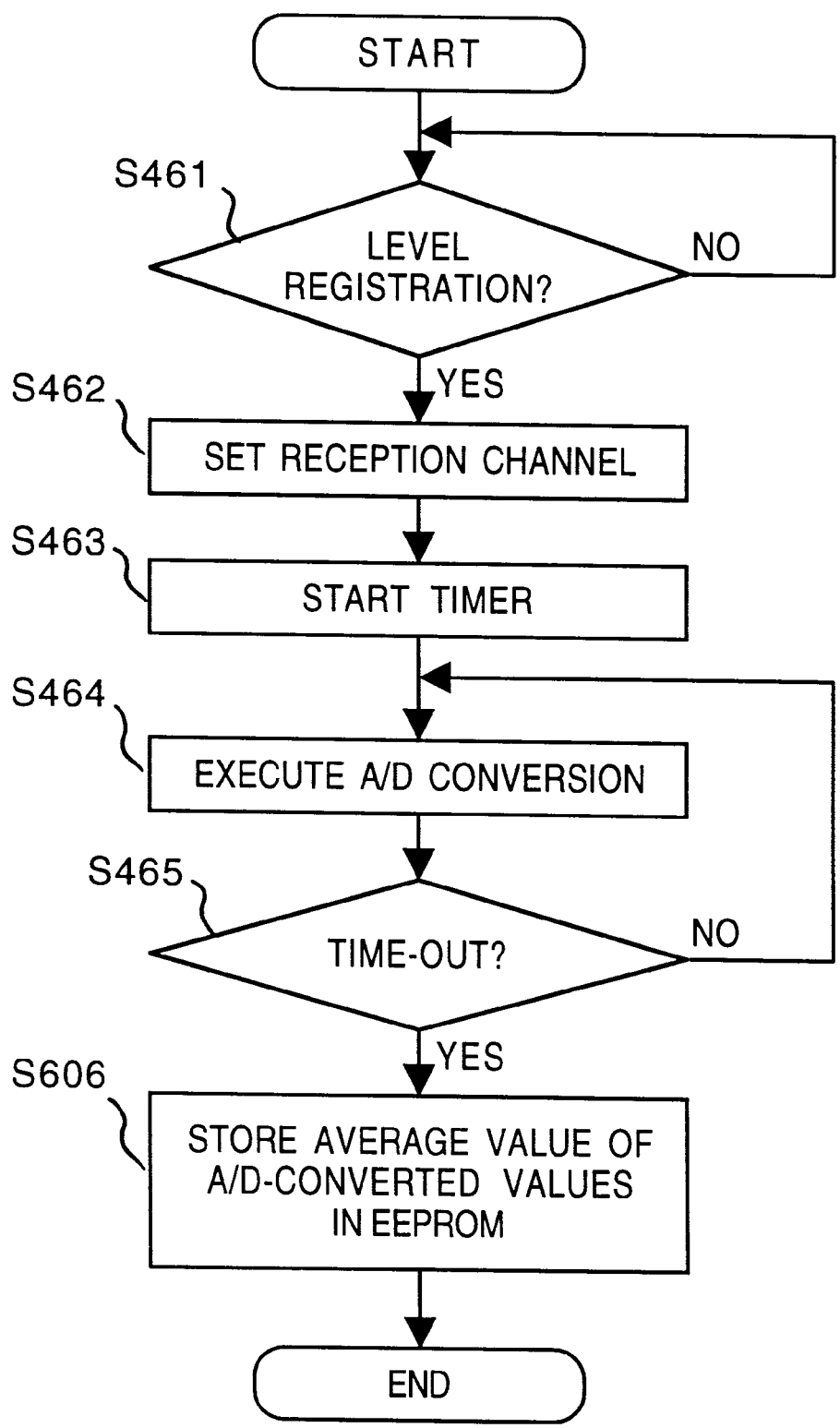
FIG. 10 is a flow chart showing a modification of carrier level registration.
Figure 11:
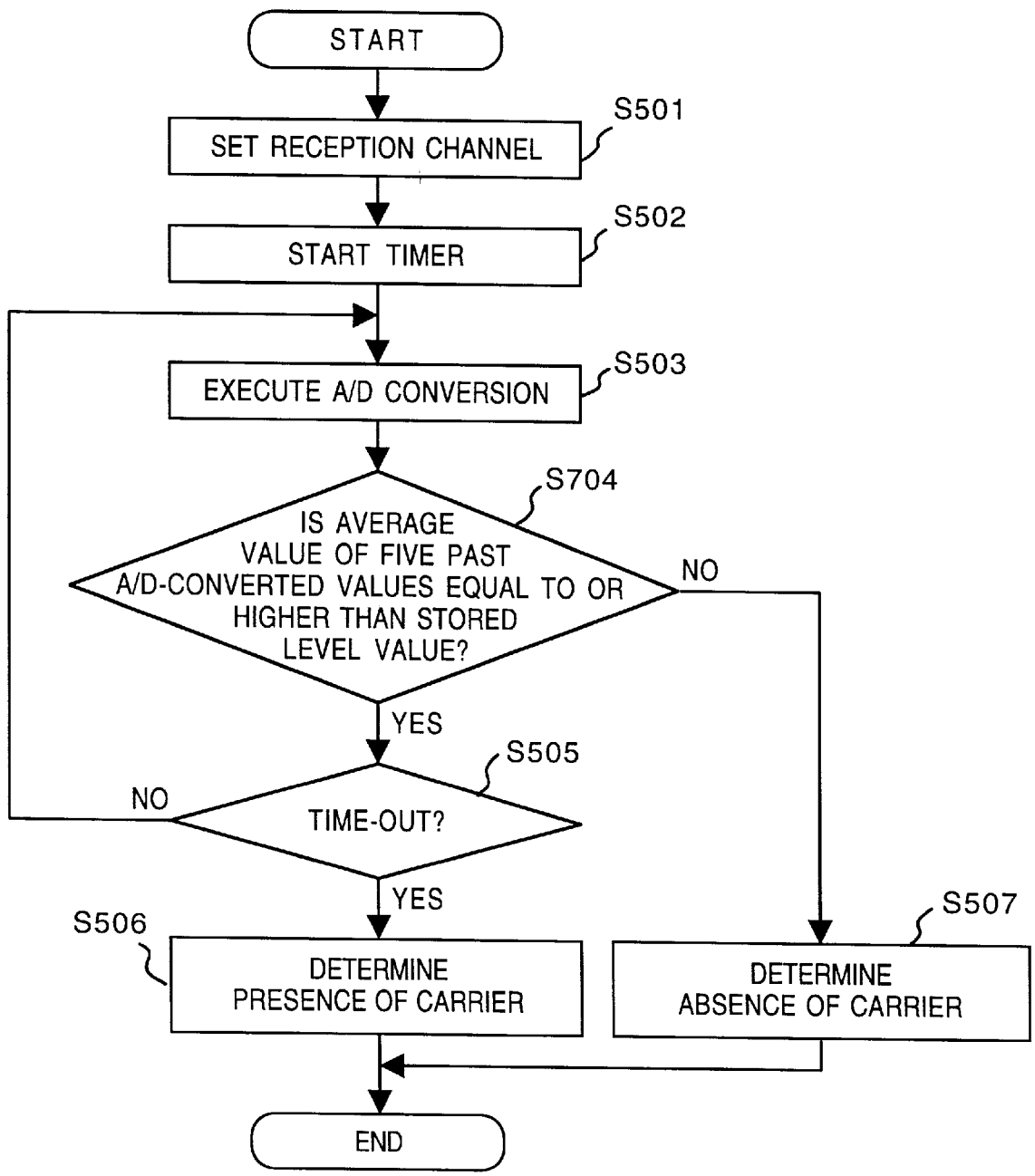
FIG. 11 is a flow chart showing a modification of carrier detection.

The flow chart shown in FIG. 10 is substantially the same as that shown in FIG. 8, except that the value to be stored in the EEPROM is an average value of A/D-converted values until the timer reaches a time-out state (S606). Upon detection of the presence/absence of a carrier, since the value stored in the EEPROM is an average value of A/D-converted values, five past A/D-converted values are compared with the value stored in the EEPROM (S704). Of course, an average value in FIG. 11 need not always be calculated using five values, but one or ten values may be used.

The mute and filter levels may be registered by the method shown in FIG. 10.

Figure 9:
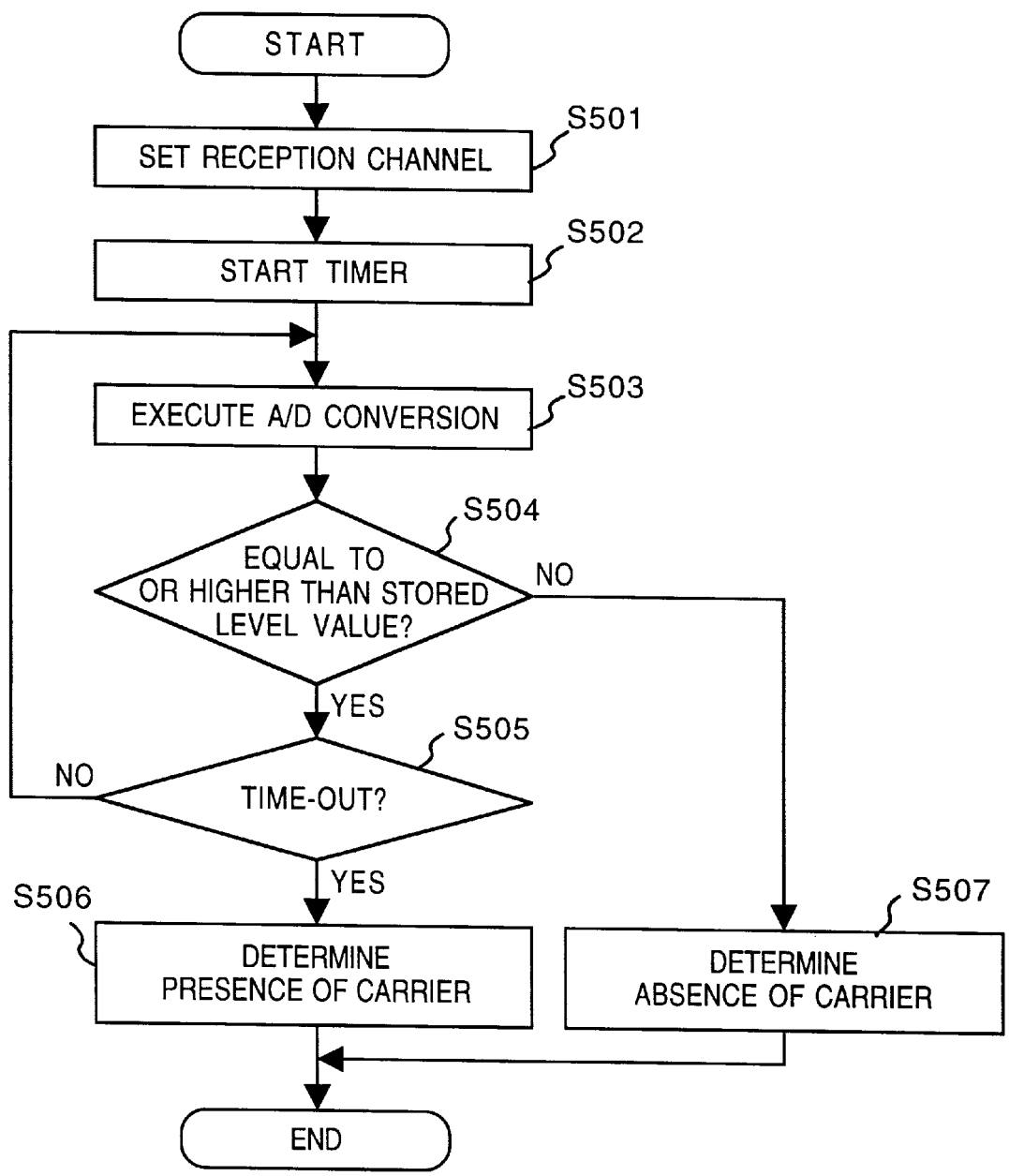
FIG. 9 is a flow chart of carrier detection.

Also, the carrier level may be registered in the EEPROM by the method shown in FIG. 10, and the presence/absence of a carrier may be detected by the method shown in FIG. 9. In this method, a radio wave signal of a strength of 1.7 $\mu$V is applied to the antenna terminal, and a value is registered in the EEPROM by the method shown in FIG. 10. Based on the registered value, the method shown in FIG. 9 is used for determining a carrier of 2 $\mu$V. Similarly, the carrier level may be registered in the EEPROM by the method shown in FIG. 8, and the presence/absence of a carrier may be detected by the method shown in FIG. 11.

FIG. 12 shows a modification of the address map of the EEPROMs 17 and 28 of the master and subsidiary units of the cordless telephone set according to the present invention.

Referring to FIG. 12, four data, i.e., a carrier level reference value, a carrier sense offset value, a mute level offset value, and a filter level offset value, are stored in the EEPROM. These data are stored by the following method. That is, a radio wave output of 2 $\mu$V is applied to the antenna terminal, and the A/D-converted value of the applied signal is stored at address 04 of the EEPROM as the carrier level reference value. Thereafter, the differences between A/D-converted values obtained when radio wave outputs of 1.7 $\mu$V, 1.3 $\mu$V, and 2.5 $\mu$V are applied to the antenna terminals, and the A/D-converted value of 2 $\mu$V are respectively stored at addresses 05, 06, and 07 of the EEPROM. Since these values are stored as complements, a carrier sense level value (70) is calculated by a carrier level reference value (80) +a carrier sense offset value (FO) =170. Similarly, a mute level value (60) and a filter level value (A0) are calculated, and the circuit control is performed using these values.

In FIG. 12, the operation for registering data in the EEPROM must be repeated four times. However, in practice, predetermined values may be registered as offset values, and an A/D-converted value may be registered in the EEPROM as the carrier level reference value. In this case, only one registration operation is required. Alternatively, the offset values may be pre-stored in the ROM as information in place of the EEPROM.

Figure 13:
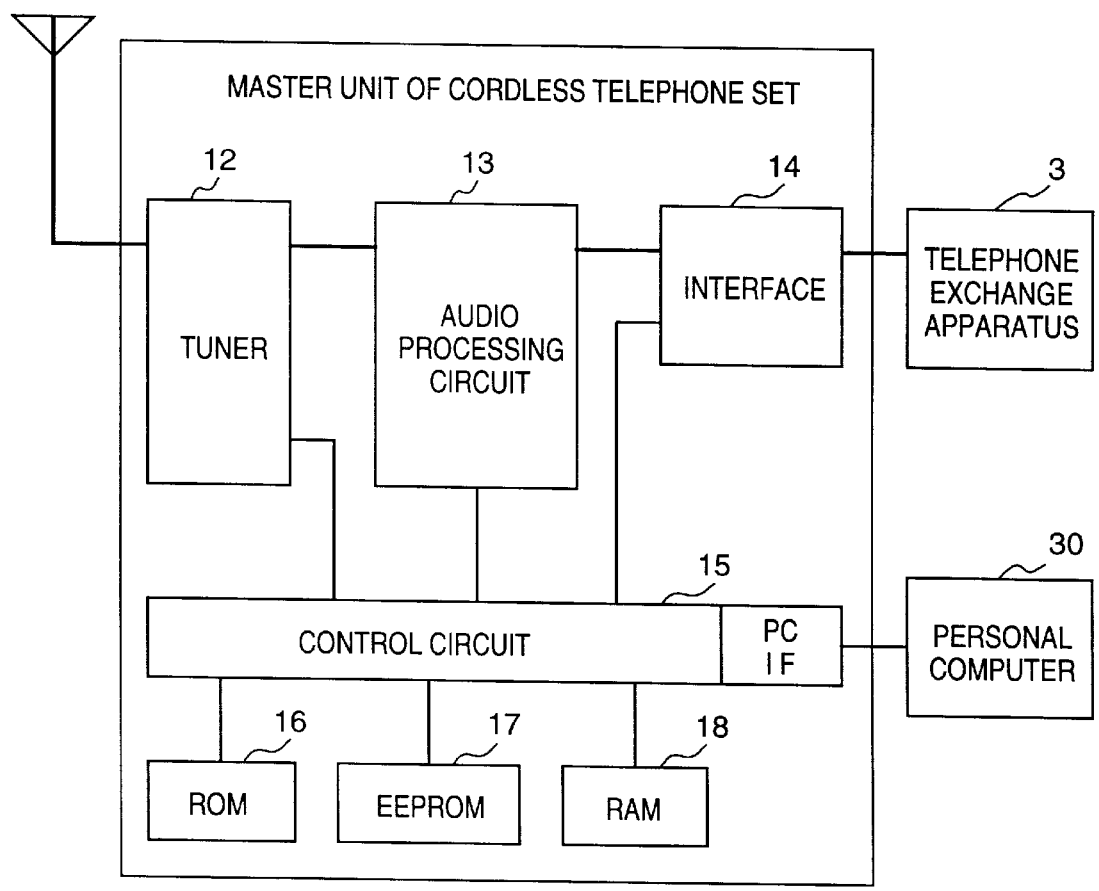
FIG. 13 is a block diagram showing a modification of the master unit of the cordless telephone set.
Figure 14:
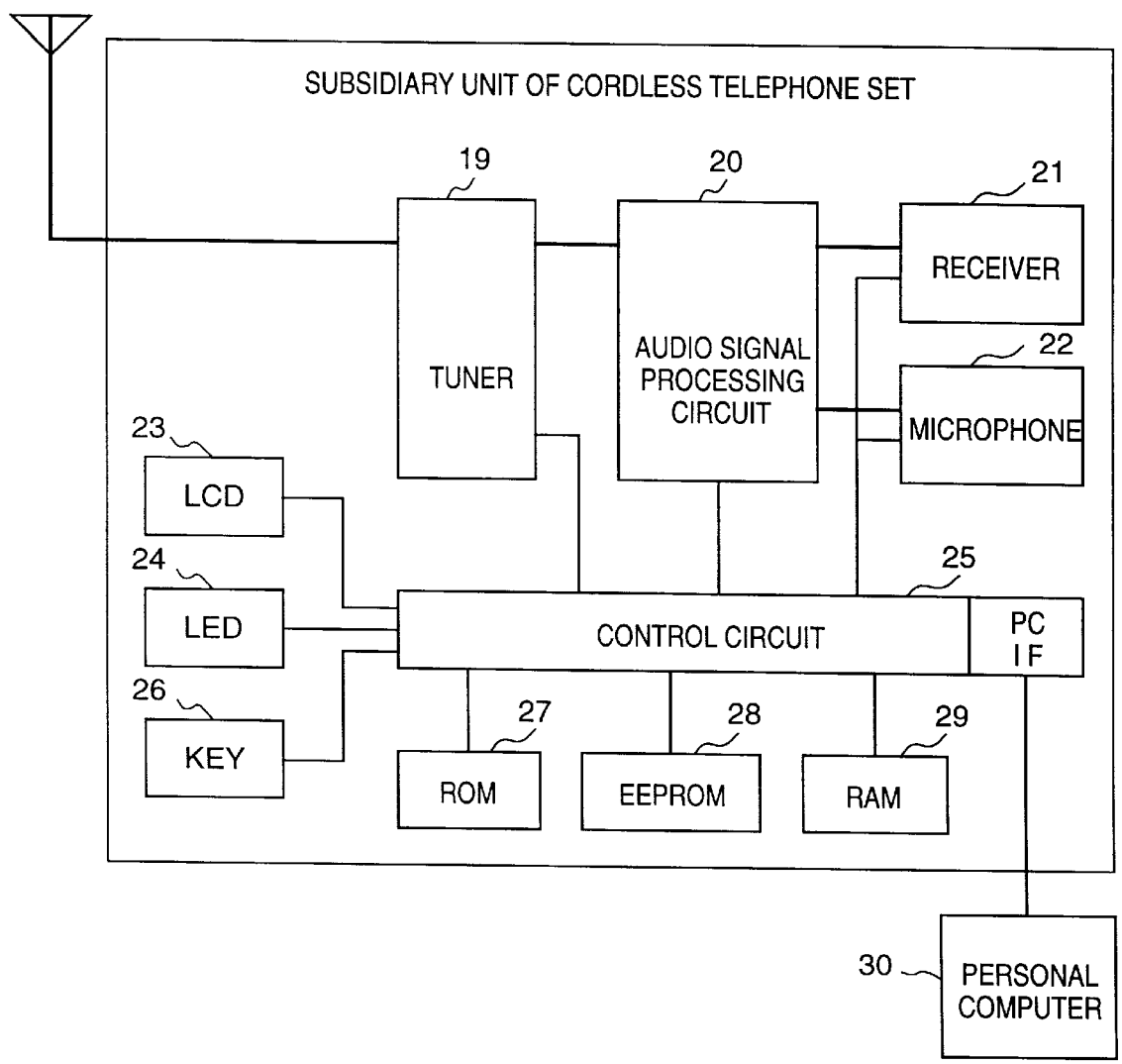
FIG. 14 is a block diagram showing a modification of the subsidiary unit of the cordless telephone set.

FIGS. 13 and 14 are block diagrams showing a modification of the master and subsidiary units of the cordless telephone set according to the present invention.

Referring to FIGS. 13 and 14, personal computer interfaces of the control circuits 15 and 25 are connected to a personal computer 30. In this modification, in place of an EEPROM registration command from the telephone exchange apparatus 3 or an EEPROM registration instruction issued by depressing a corresponding key, carrier level (or mute or filter level) registration in the EEPROM is executed in response to a command from the personal computer. In place of A/D conversion by setting a reception channel in response to a single command, a reception channel setting command may be independently issued, and the carrier level may be registered in the EEPROM using an arbitrary channel.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The preferred embodiments of the present invention have been described. However, the present invention is not limited to the arrangements of the above embodiments, and various modifications may be made within the scope of the claims.

What is claimed is:

1. A communication apparatus comprising:

reception means for receiving a signal;

memory means for storing a level of a first signal received by said reception means in accordance with a registration instruction; and control means for detecting the absence of a carrier when the level of the first signal stored in said memory means is higher than a level of a second signal received by said reception means, and for performing communication control in accordance with the absence of the carrier.

2. The apparatus according to claim 1, wherein said memory means stores a level of a third signal received by said reception means, and said control means controls a mute circuit in accordance with the level of the third signal.

3. The apparatus according to claim 1, wherein said memory means stores a level of a third signal received by said reception means, and said control means controls a filter in accordance with the level of the third signal.

4. A communication apparatus comprising:

reception means for receiving a signal;

memory means for storing a level of a first signal received by said reception means in accordance with a reference level registration instruction; and control means for performing communication control including mute control when the level of the first signal stored in said memory means is higher than a level of a second signal received by said reception means during a communication period.

5. The apparatus according to claim 4, wherein said control means discriminates the presence or absence of a carrier in accordance with the comparison result, and performs communication control in accordance with the presence or absence of the carrier.

6. The apparatus according to claim 4, wherein said control means controls a filter in accordance with the comparison result.

7. A communication apparatus comprising:

reception means for receiving a signal;

memory means for storing levels of a plurality of reference signals received by said reception means in accordance with a registration instruction; and control means for performing communication control including mute control when one of the levels of the plurality of reference signals stored in said memory means is higher than a level of a communication signal received by said reception means.

8. The apparatus according to claim 7, wherein the plurality of reference signals include a second reference signal for discriminating the presence or absence of a carrier.

9. The apparatus according to claim 7, wherein the plurality of reference signals include a second reference signal for removing noise from the communication signal.

10. A communication apparatus comprising:

reception means for receiving a signal;

memory means for storing a level of a first signal received by said reception means, wherein said memory means stores a level of a second signal; and control means for performing mute control when the level of the first signal stored in said memory means is higher than a level of a third signal received by said reception means, wherein said control means discriminates the presence or absence of a carrier in accordance with a comparison between the level of the second signal and the third signal received by said reception signal and further performs communication control in accordance with the presence or absence of the carrier.

11. The apparatus according to claim 10, wherein said memory means stores a level of a third signal, and said control means further performs noise reduction control in accordance with a comparison result between the level of the third signal and the second signal received by said reception means.

12. A communication method comprising the steps of:

receiving a signal;

storing a level of a first signal received in said receiving step in accordance with a registration instruction;

detecting the absence of a carrier when the level of the first signal stored in said memory step is higher than a level of a second signal received in said receiving step; and performing communication control in accordance with the absence of the carrier.

13. The method according to claim 12, wherein a level of a third signal received in said receiving step is stored in said storing step, and said control step controls a mute circuit in accordance with the level of the third signal.

14. The method according to claim 12, wherein a level of a third signal received in said receiving step is stored in said storing step, and said control step controls a filter in accordance with the level of the third signal.

15. A communication apparatus comprising;

reception means for receiving a signal;

memory means for storing a level of a first signal and a level of a second signal received by said reception means; and control means for detecting the absence of a carrier when the level of the first signal stored in said memory means is higher than a level of a third signal received by said reception means, and for performing communication control in accordance with the absence of the carrier, wherein said control means controls a mute circuit in accordance with the level of the second signal.

16. A communication apparatus comprising;

reception means for receiving a signal;

memory means for storing a level of a first signal and a level of a second signal received by said reception means; and control means for detecting the absence of a carrier when the level of the first signal stored in said memory means is higher than a level of a third signal received by said reception means, and for performing communication control in accordance with the absence of the carrier, wherein said control means controls a filter in accordance with the level of the second signal.

17. A communication apparatus comprising;

reception means for receiving a signal;

memory means for storing levels of a plurality of reference signals received by said reception means; and control means for performing communication control including mute control when one of the levels of the plurality of reference signals stored in said memory means is higher than a level of a communication signal received by said reception means, wherein the plurality of reference signals include a second reference signal for removing noises from the communication signal.

18. A communication apparatus comprising;

reception means for receiving a signal;

memory means for storing a level of a first signal received by said reception means, wherein said memory means stores a level of a second signal; and control means for performing mute control when the level of the first signal stored in said memory means is higher than a level of a third signal received by said reception means, and for performing noise reduction control in accordance with a comparison result between the level of the second signal and the third signal received by said reception means.

19. A communication method comprising the steps of:

receiving a signal;

storing a level of a first signal and a level of a second signal received in said receiving step;

detecting the absence of a carrier when the level of the first signal stored in said memory step is higher than a level of a third signal received in said receiving step;

performing communication control in accordance with the absence of the carrier; and controlling a mute circuit in accordance with the level of the second signal.

20. A communication method comprising the steps of:

receiving a signal;

storing a level of a first signal and a level of a second signal received in said receiving step;

detecting the absence of a carrier when the level of the first signal stored in said memory step is higher than a level of the third signal received in said receiving step;

performing communication control in accordance with the absence of the carrier; and controlling a filter in accordance with the level of the second level.

* * * * *

UNITED STATES PATENT AND TRADEMARK OFFICE
CERTIFICATE OF CORRECTION

PATENT NO. : 6,212,245 B1
DATED : April 3, 2001
INVENTOR(S) : Mitsuhiro Watanabe It is certified that error appears in the above-identified patent and that said Letters Patent is hereby corrected as shown below:

<u>Title page,</u>
Item [73], Assignee: the address for Canon Kabushiki Kaisha should read -- Tokyo, Japan --.

<u>Column 7,</u>
Line 57, "reception 10 channel" should read -- reception channel --.

Signed and Sealed this

Tenth Day of December, 2002

JAMES E. ROGAN
*Director of the United States Patent and Trademark Office*